(12) United States Patent
Anderson et al.

(10) Patent No.: US 10,915,886 B1
(45) Date of Patent: Feb. 9, 2021

(54) COLOR CHANGING PAYMENT CARD

(71) Applicant: Wells Fargo Bank, N.A., San Francisco, CA (US)

(72) Inventors: Erika L. Anderson, Oakland, CA (US); Mike Duke, Monroe, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/716,878

(22) Filed: Dec. 17, 2019

Related U.S. Application Data

(63) Continuation of application No. 16/114,390, filed on Aug. 28, 2018, now Pat. No. 10,565,583, which is a continuation of application No. 15/283,882, filed on Oct. 3, 2016, now Pat. No. 10,102,520, which is a continuation of application No. 14/588,671, filed on Jan. 2, 2015, now Pat. No. 9,483,920.

(60) Provisional application No. 61/986,243, filed on Apr. 30, 2014.

(51) Int. Cl.
  *G06Q 20/32* (2012.01)
  *G06Q 20/34* (2012.01)
  *G06K 19/077* (2006.01)

(52) U.S. Cl.
  CPC ............ *G06Q 20/34* (2013.01); *G06Q 20/32* (2013.01); *G06Q 20/342* (2013.01); *G06Q 20/352* (2013.01); *G06K 19/07703* (2013.01); *G06K 19/07705* (2013.01); *G06Q 20/357* (2013.01)

(58) Field of Classification Search
  CPC .... G06K 19/0723; G06Q 20/06; G06Q 20/32; G06Q 20/357; G06Q 20/3572; G06Q 20/3574; G06Q 20/376; G06Q 20/3552; G06Q 20/3555; G06Q 20/351
  See application file for complete search history.

(56) References Cited

U.S. PATENT DOCUMENTS

| | | |
|---|---|---|
| 7,070,112 B2 | 7/2006 | Beenau et al. |
| 7,156,301 B1 | 1/2007 | Bonalle et al. |
| 7,599,192 B2 | 10/2009 | Pennaz et al. |
| 7,607,583 B2 | 10/2009 | Berardi et al. |
| 7,628,336 B2 | 12/2009 | Reynolds et al. |
| 7,791,489 B2 | 9/2010 | Gelbman et al. |
| 8,191,788 B2 | 6/2012 | Morrill-Webb et al. |
| 8,240,574 B2 | 8/2012 | Lasch et al. |
| 8,393,955 B2 | 3/2013 | Arezina et al. |
| 8,480,482 B2 | 7/2013 | Walker et al. |
| 8,544,753 B2 | 10/2013 | Antebi et al. |

(Continued)

OTHER PUBLICATIONS

ArtistRaj, "Color Changing Credit Card," http://www.halfbakery.com/idea/Color_20Changing_20Credit_20Card, Feb. 19, 2007, 2 pages.

*Primary Examiner* — Benyam Haile
(74) *Attorney, Agent, or Firm* — Merchant & Gould P.C.

(57) ABSTRACT

A method includes receiving, on an electronic payment device, a radio frequency signal from a mobile electronic device. The radio frequency signal is used to control an activation of an electric current to one or more color producing components on the electronic payment device. The electric current is transmitted to the one or more color producing components. The one or more color producing components display a color when the electric current is transmitted to the color producing components.

18 Claims, 11 Drawing Sheets

(56) References Cited

U.S. PATENT DOCUMENTS

| | | | |
|---|---|---|---|
| 8,788,418 B2* | 7/2014 | Spodak | G06K 19/0725 |
| | | | 705/41 |
| 9,483,920 B1 | 11/2016 | Anderson et al. | |
| 10,102,520 B1 | 10/2018 | Anderson et al. | |
| 2002/0070279 A1 | 6/2002 | Zausner | |
| 2007/0206375 A1 | 9/2007 | Piepgras et al. | |
| 2008/0001758 A1 | 1/2008 | Bhogal et al. | |
| 2008/0123174 A1 | 5/2008 | Wen et al. | |
| 2008/0246748 A1 | 10/2008 | Cassidy et al. | |
| 2010/0182507 A1 | 7/2010 | Haggis et al. | |
| 2011/0062242 A1 | 3/2011 | Cowcher | |
| 2011/0284632 A1 | 11/2011 | Mullen et al. | |
| 2012/0026564 A1 | 2/2012 | Takemori et al. | |
| 2012/0109735 A1 | 5/2012 | Krawczewicz et al. | |
| 2013/0202185 A1 | 8/2013 | Irwin, Jr. et al. | |
| 2014/0183269 A1 | 7/2014 | Glaser | |
| 2015/0070743 A1 | 3/2015 | Branda et al. | |
| 2015/0274761 A1 | 10/2015 | Sagisaka et al. | |
| 2015/0286077 A1 | 10/2015 | Simonato et al. | |
| 2015/0307040 A1 | 10/2015 | Heyden et al. | |

* cited by examiner

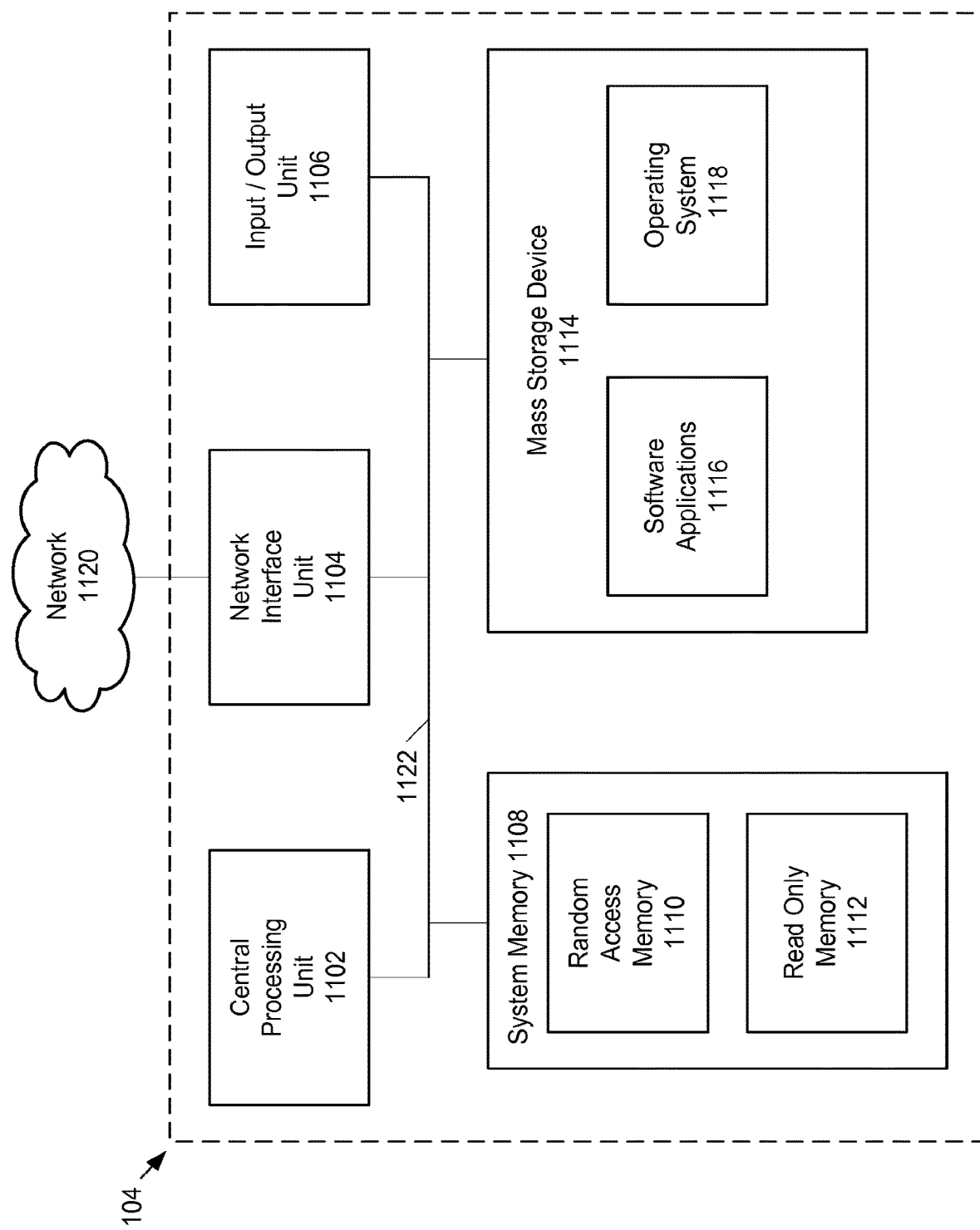

COLOR CHANGING PAYMENT CARD

BACKGROUND

Payment cards are ubiquitous in the world today and provide a convenient way for users of the payment cards to purchase goods and services. The payment cards are typically issued to the users by a bank or other type of financial institution. As used in this disclosure, payment cards include both credit cards and debit cards. Credit cards permit users to purchase goods and services using credit. Debit cards permit users to access the user's bank or other financial account to purchase goods and services. Debit cards typically function like a check.

Most payment cards have spending limits for users of the payment cards. The spending limits are associated with a financial history of the users. However, when making purchases, many users are not cognizant of how close they may be to the spending limit of their payment card.

SUMMARY

Embodiments of the disclosure are directed to a method implemented on an electronic payment device, the method comprising: on the electronic payment device, receiving a radio frequency signal from a mobile electronic device; using the radio frequency signal to control an activation of an electric current to one or more color producing components on the electronic payment device; and transmitting the electric current to the one or more color producing components, wherein the one or more color producing components display a color when the electric current is transmitted to the color producing components.

In another aspect, a credit card comprises: a plastic base; a radio frequency identification (RFID) device; a power source; one or more switching components; and one or more financial status indication components, wherein the one or more switching components are triggered by a frequency from the RFID device, the one or more switching components controlling an electric current from the power source to the one or more financial status indication components, and wherein the one or more financial indication components provide an indication of a credit account status for the credit card.

In yet another aspect, a method implemented on a credit card comprises: receiving, by a radio frequency identification component on the credit card, a radio frequency signal from a mobile electronic device, the radio frequency signal being of a frequency corresponding to a credit card account status for a user of the credit card; using the radio frequency signal to control an activation of one or more electrical switching components on the credit card, each electrical switching component being configured to connect one or more wires or foil strips into an electrical circuit on the credit card, a determination of which of the one or more switching components to be activated being based on the frequency of the radio frequency signal; after the one or more electrical switching components are activated, generating an electric current from a power source on the credit card to the one or more connected wires or foil strips; and when the electric current is generated, producing a color in the one or more connected wires or foil strips, the color being dependent on an electrical resistance of each of the connected wires or foil strips, the color being representative of the credit card account status for the user.

The details of one or more techniques are set forth in the accompanying drawings and the description below. Other features, objects, and advantages of these techniques will be apparent from the description, drawings, and claims.

DESCRIPTION OF THE DRAWINGS

FIG. 11 shows example physical components of the mobile electronic device of FIG. 1.

DETAILED DESCRIPTION

Figure 1:
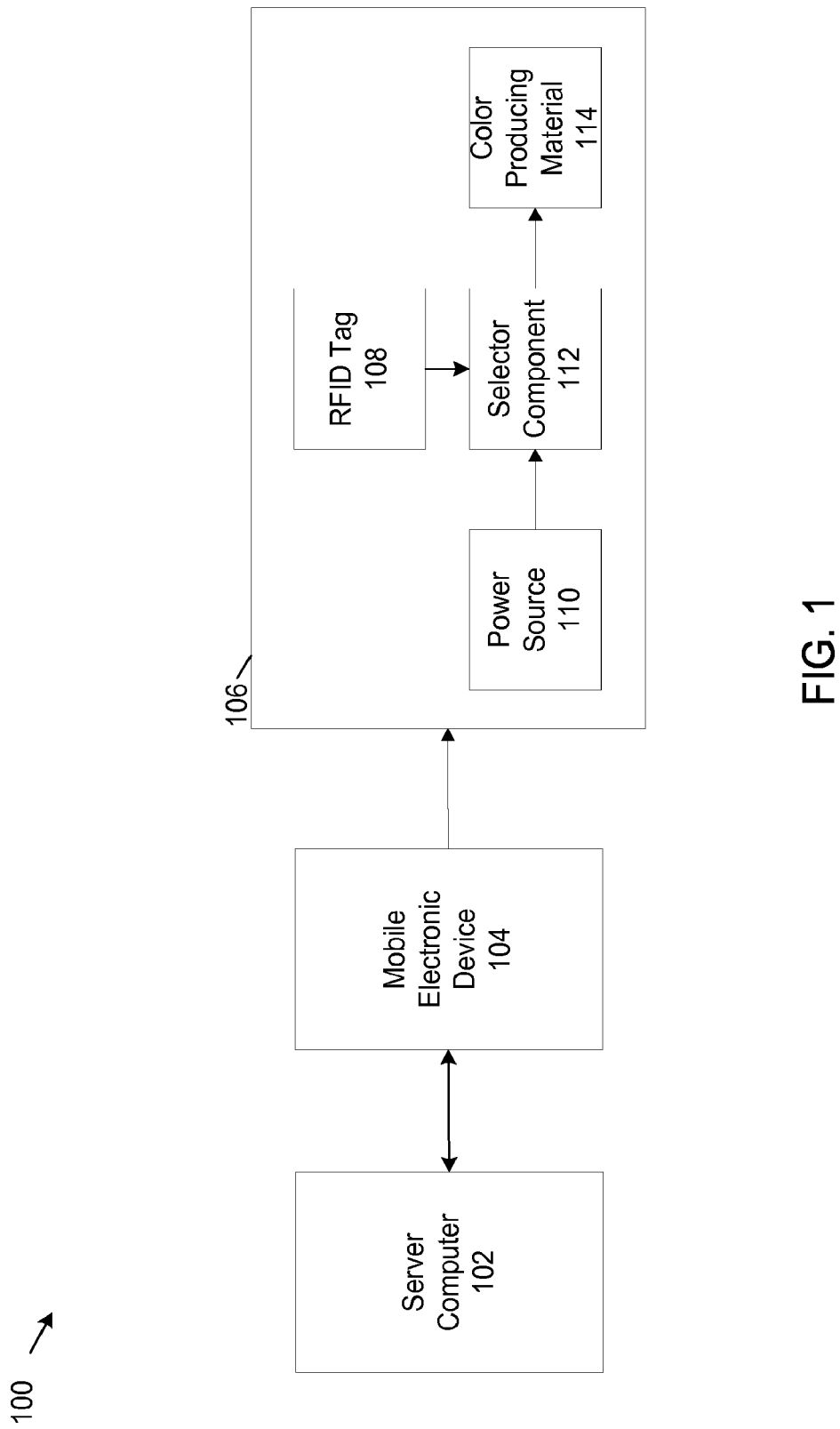
FIG. 1 shows an example system that supports a color changing credit or debit card.

8 The present disclosure is directed to systems and methods for displaying a status of an individual's payment card account. In this disclosure, the individual is referred to as the user. In typical implementations, the status is presented to the user via a color display on the payment card. For example, a green color may indicate that an outstanding balance for the payment card is within a spending limit for the payment card, a yellow color may indicate that the card balance is approaching the spending limit and a red color may indicate that the card balance is over the spending limit. In other implementations, the status is presented to the user via an electronic display. In this disclosure, the systems and methods are discussed with regard to credit cards. However, the systems and methods also apply to debit cards.

Typically, the display of the card account status is initiated via a software application on a mobile electronic device such as a smart telephone. When the user activates the software application, typically by pressing an icon or button on the mobile electronic device, the mobile electronic device transmits an electronic signal to the credit card. The electronic signal comprises a radio wave of a specific frequency. The specific frequency corresponds to a card account status. For example one frequency may correspond to a good status, another frequency or may correspond to a borderline status and a third frequency may correspond to an over the limit status. As explained later in this disclosure, each frequency causes the credit card to display a color indicative of the card account status.

The color display on the credit card may be implemented by one of several methods. In one method, a color producing material may be used. Typically, the color producing material changes color in response to heat. In some implementations, the color producing material is a wire, for example a foil strip. In other implementations, the color producing material is a chemical, for example a gel that changes color in response to heat. One example of such a gel is a temperature responsive polymer.

In the systems and methods, the heat is generated by passing an electric current through the color producing material. When the color producing material is a foil type of material, the heat is generated in proportion to an amount of electrical resistance in the foil type of material. The greater the electrical resistance, the more heat is produced. When the color producing material is a gel, the heat is produced when the electric current flows through the gel. The greater the electric current, the more heat is produced. Different amounts of heat in the foil type of material and the gel cause different colors to be produced.

In a typical implementation the color producing material is layered onto the credit card. For example, the color producing material may comprise a transparent foil material. The transparent foil may be wrapped around the credit card, covering the plastic material of the credit card. A clear film may be wrapped around the transparent foil and pressed into place on the credit card. In this implementation, the credit card comprises three layers—the plastic of the credit card, the transparent foil material and the clear film. When a chemical gel material is used, the chemical gel material is substituted for the transparent foil material.

In another implementation, the color producing material may be applied to only a portion of the credit card, for example around the edges of the credit card or in a specific area of the credit card. Other implementations are possible.

In a second method, the color display on the credit card may be implemented via a plurality of contiguous multi-sided mechanical panels. Each multi-sided panel is of a different color. For example, for a three-sided panel, one side may be colored green, a second side may be colored yellow and a third side may be colored red. Each panel may be rotated to display one of the three colors. In some implementations, the multi-sided panel may be rotated each time the electric current is activated, in other implementations, a value or duration of the electric current may determine how many times the multi-sided panel is rotated. In some implementations, when each three-sided panel is rotated once, the color green may be displayed, when each three-sided panel is rotated a second time, the color yellow may be displayed and when each three-sided panel is rotated a third time, the color red may be displayed. In other implementations, different colors may be displayed.

For the second method, the number of times the multi-sided panels are rotated is based on the frequency of the electric signal received by the credit card. In one example implementation, one received frequency may result in one rotation of the multi-sided panels, another received frequency may result in two rotations of the multi-sided panels and a third received frequency may result in three rotations of the multi-sided panels. Other implementations are possible.

FIG. 1 shows an example system 100 that supports a color changing credit or debit card. The example system 100 includes a server computer 102, a mobile electronic device 104 and a credit card 106. The credit card 106 includes a radio frequency identification (RFID) tag 108, a power source 110, a selector component 112 and a color producing material 114.

The example server computer 102 is typically a server computer at a financial institution, for example at a bank. The server computer 102 provides access to the user's credit card history and provides a credit card account status for the user.

The example mobile electronic device 104 is typically a smart telephone or a tablet computer. The mobile electronic device 104 includes a financial software application. The financial software application provides a display of the user's credit card balance and credit limit. The financial software application also typically includes an icon or a button that permits activation of a display on the credit card of the credit card account status for the user. In some implementations, the mobile electronic device 104 includes displays an icon for activation of the display of the credit card account status on the credit card. In this implementation, the user simply presses the icon, instead of needing to open the financial software application.

The financial software application also permits the user to set budget parameters for the credit card or debit card. For example, the user can set a spending limit for the credit card or debit card. The spending limit may be set for a specific time frame. For example, the user may configure the credit card or debit card for a maximum spending limit of $500 for the current week or month. Using the systems and methods, the color of the credit card or debit card may change depending on how close the user is to the configured spending limit. In some implementations, the budget parameters may be set using an online or mobile banking digital dashboard. In other implementations, the budget parameters may be set via the financial software application on the mobile electronic device 104.

The RFID tag 108 is a radio frequency identification (RFID) device that is embedded in or attached to the credit card. The RFID tag 108 receives a radio frequency signal from the mobile electronic device 104 and generates a control signal in response to the radio frequency signal. The control signal controls a selection of the selector component 112, as explained later herein.

The radio frequency signal received from the mobile electronic device 104 may be of one of several frequencies or in one of several frequency ranges. One frequency or frequency range may correspond to a good credit card balance for the user, a second frequency or frequency range may correspond to a borderline credit card balance and a third frequency or frequency range may correspond to a credit card balance that is over the credit card limit for the user. As explained later herein, when the radio frequency signal of the first frequency or first frequency range is received, the RFID tag 108 generates a control signal that causes the credit card to display a color or an image indicating a good credit card balance. When the radio frequency signal of the second frequency or second frequency range is received, the RFID tag 108 generates a control signal that causes the credit card to display a color or an image indicating a borderline credit card balance. When the radio frequency signal of the third frequency or third frequency range is received, the RFID tag 108 generates a control signal that causes the credit card to display a color or an image indicating a credit card balance that is higher than the user's credit card limit.

The radio frequency signals generated by the mobile electronic device 104 correspond to matching frequencies or frequency ranges on the user's credit card. The intent is to send the credit card account status to the user's credit card and not to another person's credit card. An RFID device on the user's credit card is configured to match the frequencies sent from the user's smart telephone. In order to provide better matching capability, the RFID tag 108 may accept frequencies in one of three frequency ranges rather than requiring one of three specific frequencies.

In some implementations, an electronic component other than an RFID tag may be used to communicate with the smart telephone. For example, in some implementations, a thin semiconductor communication chip may be used. The semiconductor communication chip may include logic that may parse the radio signal frequency and generate the control signal that causes the credit card to display a color or display an image corresponding to the user's credit card account status.

The power source 110 is typically a battery that is mounted on or embedded in the credit card. The battery provides power that permits a color to be produced by the color producing material 114. The battery is typically a very small, thin battery that may be attached to or embedded into the credit card.

The selector component 12 controls electric current flow into the color producing material 114. In some implementations, the selector component 112 comprises one or more miniature electrical relays. In other implementations, the selector component 112 comprises one or more miniature solid state relays. In yet other implementations, the selector component comprises a semiconductor switch. Other implementations are possible. The selector component 112 is explained in more detail later herein.

The color producing material 114 may be a foil type of material, a chemical gel material or another type of material that generates a color when heated. In addition, the color producing material 114 may be a mechanical device that changes color. Other types of color producing materials 114 are possible.

When the color producing material 114 is a foil type of material, the selector component 112 selects one of three foil strips or of a combination of one, two or three foil strips. As explained in more detail later herein, each selection results in a different total electrical resistance for the foil strips and also results in a different electric current to the foil strips. The different electrical resistances cause different amounts of heat to be generated by the foil strips. The different amounts of heat cause different colors to be generated by the foil strips. In this implementation, one color is green, a second color is yellow and a third color is red. One example of a foil type of material is a silver nylon fabric.

When the color producing material 114 is a gel, the gel produces heat when an electrical current flows through the gel. When the gel produces heat, the gel changes color. The color that the gel produces is dependent on the amount of electrical current flowing through the gel. The amount of electrical current flowing through the gel is controlled by the selector component 112, typically by selecting different electrical resistances, as explained later herein. The selection of the different electrical resistances is controlled by the frequency or range of frequencies of the radio frequency signal from the mobile electronic device 104. One frequency or range of frequencies results in the gel turning a green color, another frequency or range of frequencies results in the gel turning a yellow color and yet another frequency or range of frequencies results in the gel turning a red color.

When the color producing material 114 is a foil type of material, in some implementations, the foil type of material may cover a large area of the credit card, for example on the entire front of the credit card. In other implementations, the foil type of material may cover a smaller area of the credit card, for example an area comprising the edges of the credit card. Similarly, when the color producing material is a chemical gel, the gel may cover a large area of the credit card or may cover only a small area of the credit card.

When the color producing material 114 is a mechanical device, the mechanical device displays color by changing an orientation of the mechanical device. In a typical implementation using a mechanical device, the mechanical device comprises a series of contiguous multi-sided panels that have a different color on each panel side. One side of each panel is oriented to a front of the credit card. The panels rotate in unison to display a different side of the multi-sided panels, and therefore to display a different color.

Figure 2:
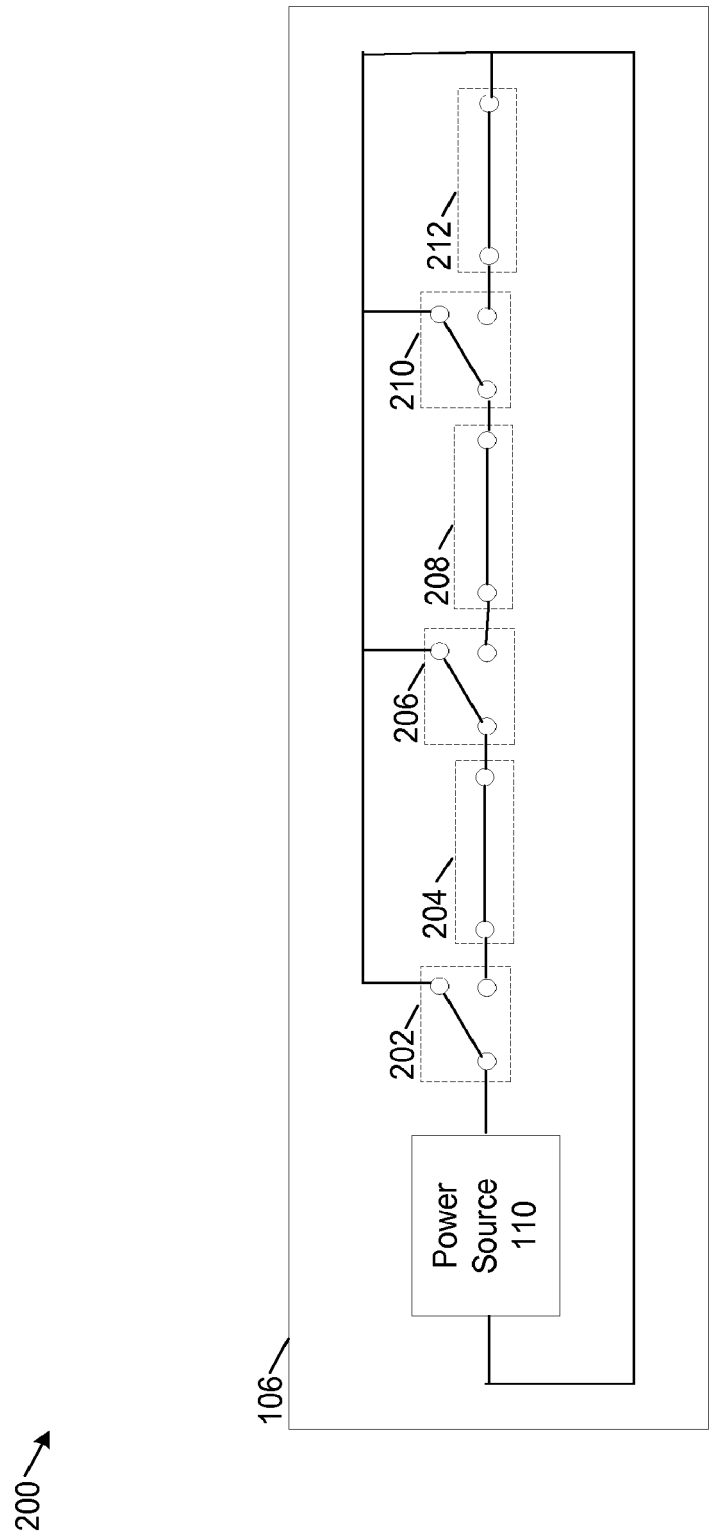
FIG. 2 shows an example electric circuit for a color producing material of FIG. 1.

FIG. 2 shows an example implementation 200 of an electrical circuit for a foil type color producing material on credit card 106. The example implementation 200 includes the power source 110, three switches 202, 206 and 210 and three foil strips 204, 208 and 212. The three switches 202, 206 and 210 comprise the selector component 112 and the three foil strips 204, 208, 212 comprise the color producing material 114. The switches may be electrical relays, semiconductor switches or other types of electrical switching devices.

In the example implementation 200, switches 202, 206 and 210 are initially open. When the switches 202, 206 and 210 are open, no current flows through foil strips 204, 208 and 212. In the example implementation 200, the foil strips 204, 208 and 212 are identical, each having a same value of electrical resistance. When the RFID tag 108 receives a radio frequency signal at a first frequency from the mobile electronic device 104, the RFID tag 108 generates a control signal that causes switch 202 of the selector component 112 to close. When switch 202 closes, electric current flows from power source 110 through foil strip 204 and back to the power source 110. When the electric current flows through foil strip 204, the foil strip 204 heats up and changes color. For example, the electrical resistance of foil strip 204 may be selected such that when an electric current flows through foil strip 204, foil strip 204 produces a green color.

In the example implementation 200, when the RFID tag 108 receives a radio frequency signal at a second frequency from the mobile electronic device 104, the RFID tag 108 generates a control signal that causes both switch 202 and switch 206 of the selector component 112 to close. When switcher 202 and 206 are both closed, electric current flows from power source 110 through foil strips 204 and 208 and back to power source 110. Because electric current flows through foil strips 204 and 208, there is now twice the electrical resistance in the circuit as for when the first frequency or first frequency range of radio frequency signals was received. As a result, more heat is produced and a different color, for example yellow, is produced.

Similarly, when the RFID tag 108 generates a radio frequency signal at a third frequency, switches 202, 206 and 212 are all closed, causing an electric current to flow though each of foil strips 204, 208 and 212. There is now three times the electrical resistance in the circuit as for when the first frequency or first frequency range of radio frequency signals was received. As a result, more heat is produced and a different color, for example red, is produced by the foil strips.

In the example implementation 200, switches 202, 206 and 210 may be mechanical relays or solid state relays. In other implementations similar to implementation 200, a series of semiconductor switches may be used. The semiconductor switches typically require less power and are smaller than the mechanical and solid-state relays.

Figure 3:
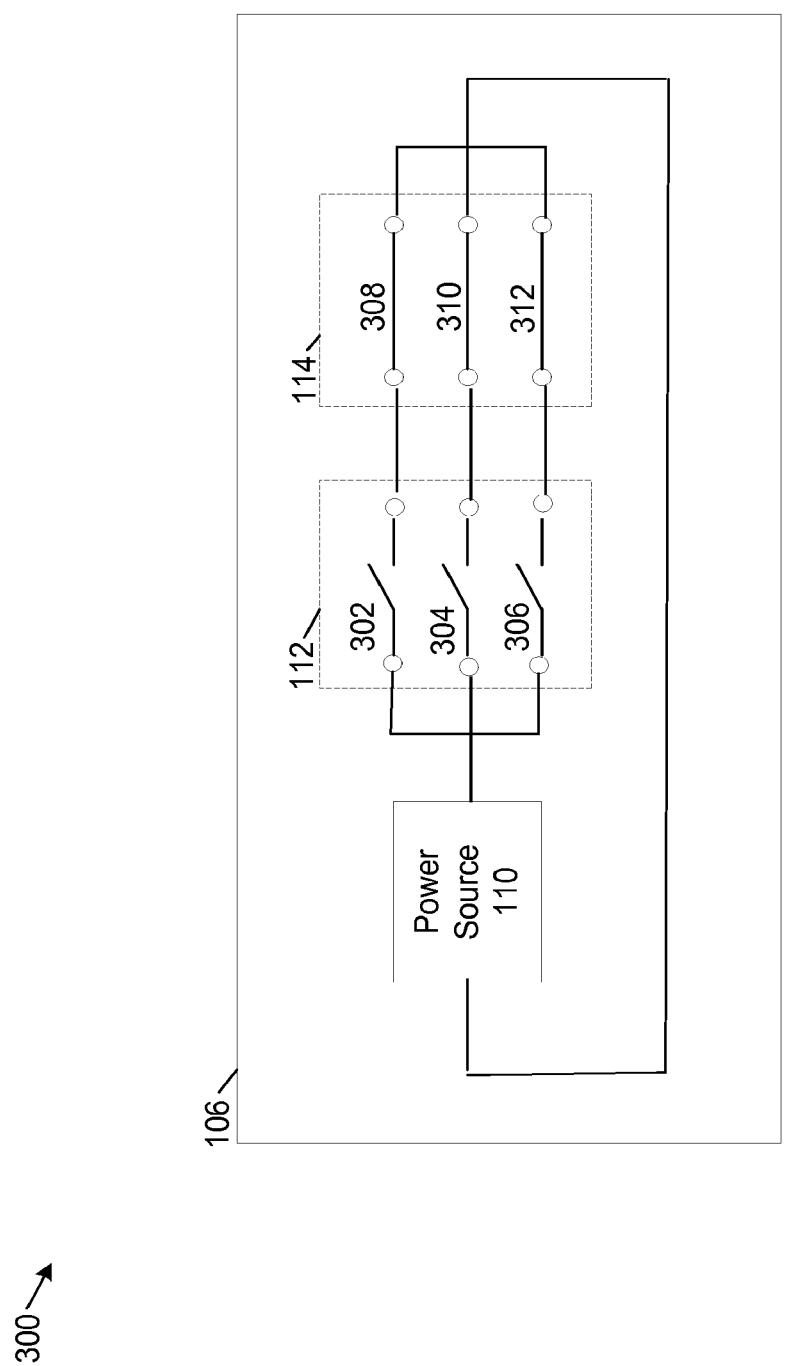
FIG. 3 shows another example electric circuit for the color producing material of FIG. 2.

FIG. 3 shows another example implementation 300 of an electrical circuit for a foil type color producing material on credit card 106. The example implementation 300 includes power source 110, switches 302, 304 and 306 and foil strips 308, 310 and 312. Switches 302, 304 and 306 comprise selector component 112. Foil strips 308, 310 and 312 comprise color producing material 114. In the example implementation 300, foil strips 308, 310 and 312 are identical and each has a same value of electrical resistance. However, in implementation 300, switches 302, 304 and 306 are arranged in parallel. When switch 302 is closed, electric current flows through foil strip 308. When switch 304 is closed, electric current flow through foil strip 310 and when switch 306 is closed, electric current flows through foil strip 312. When one switch is closed, for example switch 302, foil strip 308 heats up and produces one color, for example green. When two switches are closed, for example switches 302 and 304, foil strips 308 and 310 both heat up. Because more heat is generated, a second color, for example yellow is produced. When three switches are closed, for example switches 302, 304 and 306, foil strips 308, 310 and 312 all heat up, producing a third color, for example red.

In another example implementation 300 using the configuration of FIG. 3, foil strips 308, 310 and 312 may be different. For example, foil strip 310 may have two times the electrical resistance of foil strip 308 and foil strip 312 may have three times the electrical resistance of foil strip 308. In this implementation only one of switches 302, 304 and 306 is closed. When switch 302 is closed, electrical current flows through foil strip 308, producing a first value of heat and displaying a first color, for example green. When switch 304 is closed, electrical current flows through foil strip 310 producing a second value of heat greater than the first value of heat and displaying a second color, for example yellow. The second value of heat is greater than the first value of heat because the electrical resistance of foil strip 310 is two times the electrical resistance of foil strip 308. Similarly, when switch 306 is closed, electrical current flows through foil strip 312 producing a third value of heat greater than the second value of heat and displaying a third color, for example red.

Configurations similar to that shown in FIGS. 2 and 3 may also be used when the color producing material 114 is a color producing gel. In this case, the foil strips 204, 208 and 212 and the foil strips 308, 310 and 312 may be used to provide electrical resistance to limit current to the color producing gel. When different values of electrical current are applied to the color producing gel, the color producing gel produces different colors. For example, the electrical current may be such that the gel produces colors green, yellow and red. In these configurations, the color producing gel may be applied to a large area of the credit card (for example the entire front of the credit card) or to smaller areas of the credit card. The foil strips 204, 208, 212, 308, 310 and 312 may be configured such that they do not display color. For example the foil strips may be embedded within the credit card or covered with a thin opaque film.

Figure 4:
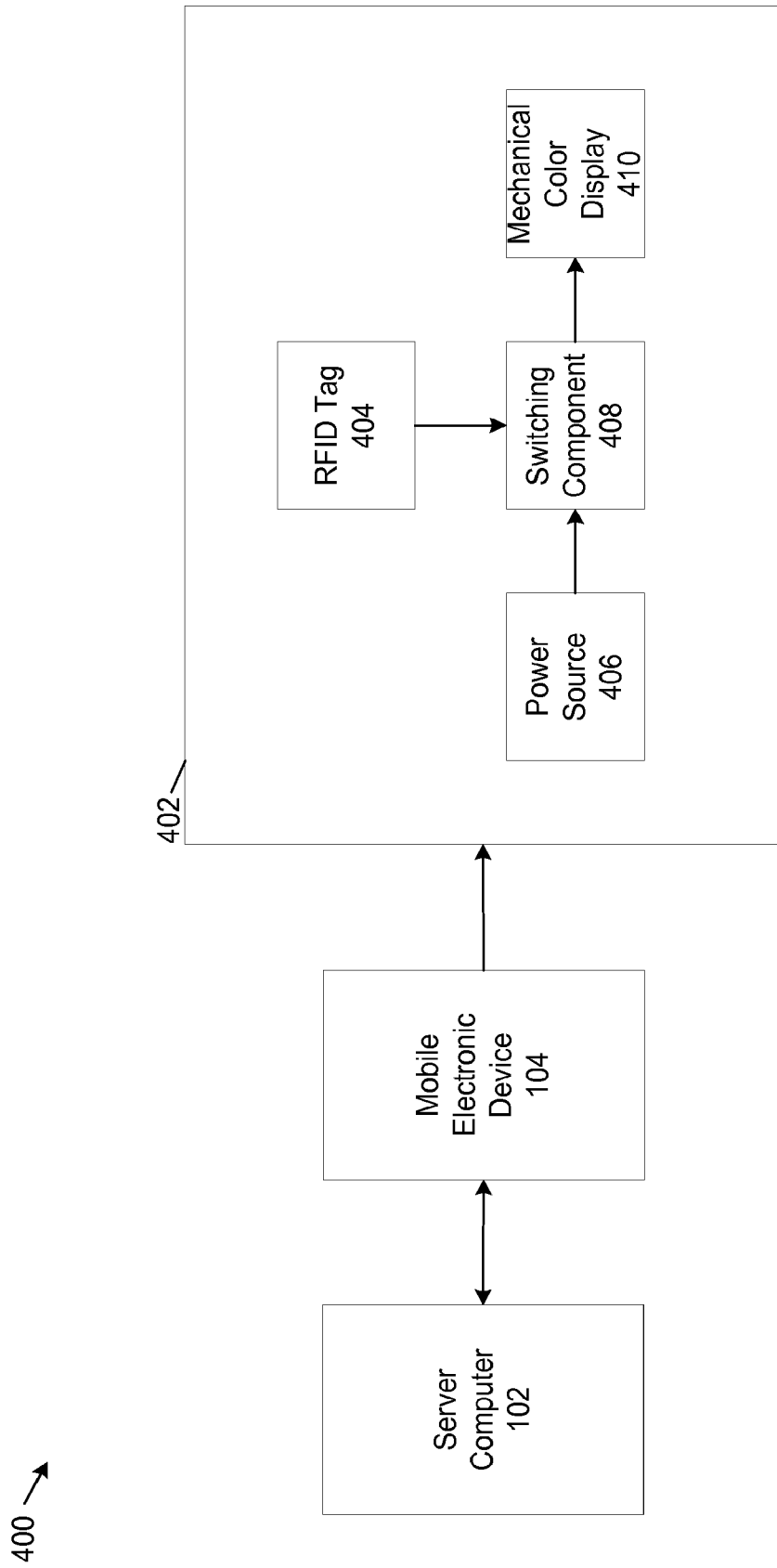
FIG. 4 shows another example system that supports a color changing credit or debit card.

FIG. 4 shows an example system 400 that supports a color changing credit or debit card having a mechanical color display device. The example system 400 includes the server computer 102, the mobile electronic device 104 and a credit card 402. The credit card 402 includes an RFID tag 404, a power source 406, a switching component 408 and a mechanical color display 410.

The RFID tag 404 and power source 406 are similar to RFID tag 108 and power source 110, respectively. The switching component 408 provides a means to switch electrical current on an off from the power source 406 to the mechanical color display 410.

The mechanical color display 410 is a plurality of multi-sided mechanical panels, typically three-sided panels, each side having a different color. One side of each of the multi-sided panels faces the front of the credit card to display a first color, for example green. Each of the multi-sided panels may be simultaneously rotated to display a different color, for example yellow or red.

Figure 5:
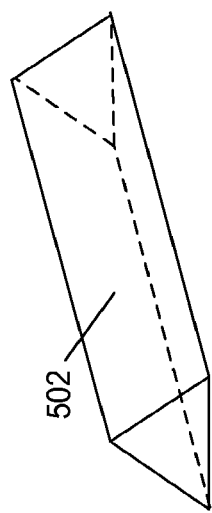
FIG. 5 shows an example mechanical color display of FIG. 4.

FIG. 5 shows an example three-sided panel 500. The three-sided panel has three rectangular shaped sides. One example side 502 is positioned so that the side 502 is flush with the front of the credit card. The example side 502 is of a first color, for example green. The other two sides are of different colors, for example yellow and red. When the three-sided panel is rotated 120 degrees, a second color, for example yellow, becomes flush with the front of the credit card. When the three-sided panel is rotated another 120 degrees, a third color, for example red, becomes flush with the front of the credit card.

Figure 6:
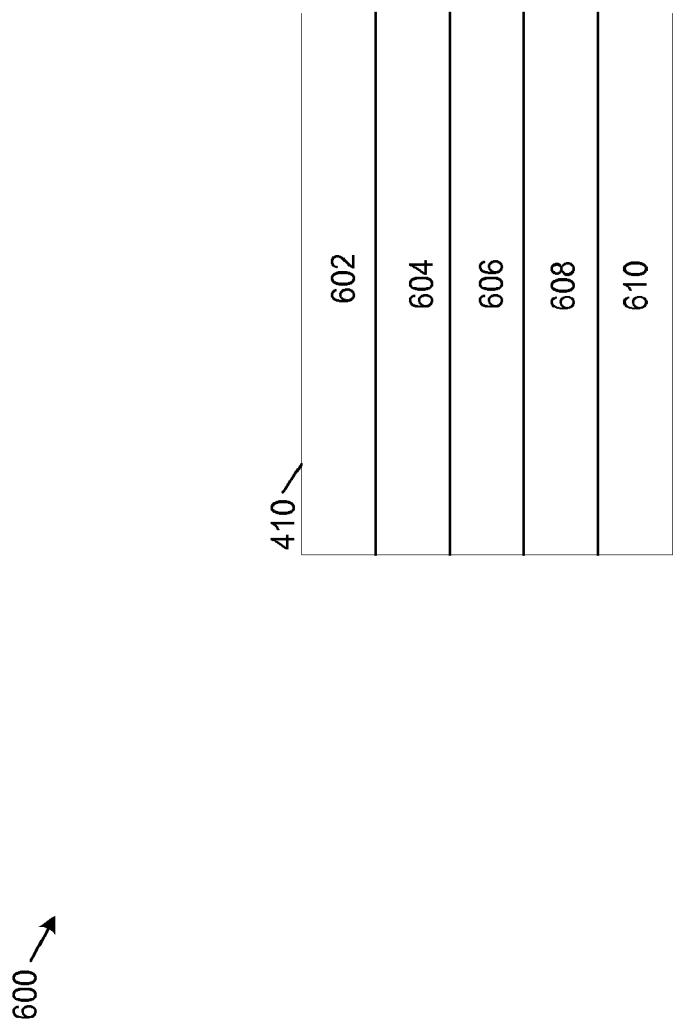
FIG. 6 shows an example configuration for the mechanical color display of FIG. 4.

FIG. 6 shows an example configuration 600 of the mechanical color display 410. In the example configuration 600, five contiguous multi-sided panel display devices 602, 604, 606, 608 and 610 are shown. Each of the five contiguous multi-sided panel display devices are configured so that each multi-sided panel display device has the same color that is flush with the front of the credit card. Each of the multi-sided panel displays is rotated 120 degrees simultaneously so that a different colored panel, for example yellow, is flush with the front of the credit card. Each time the multi-sided panel displays is rotated a different color is displayed—either green, red or yellow. Other colors may be used. More, fewer or different sized multi-sided panels may be used.

Figure 7:
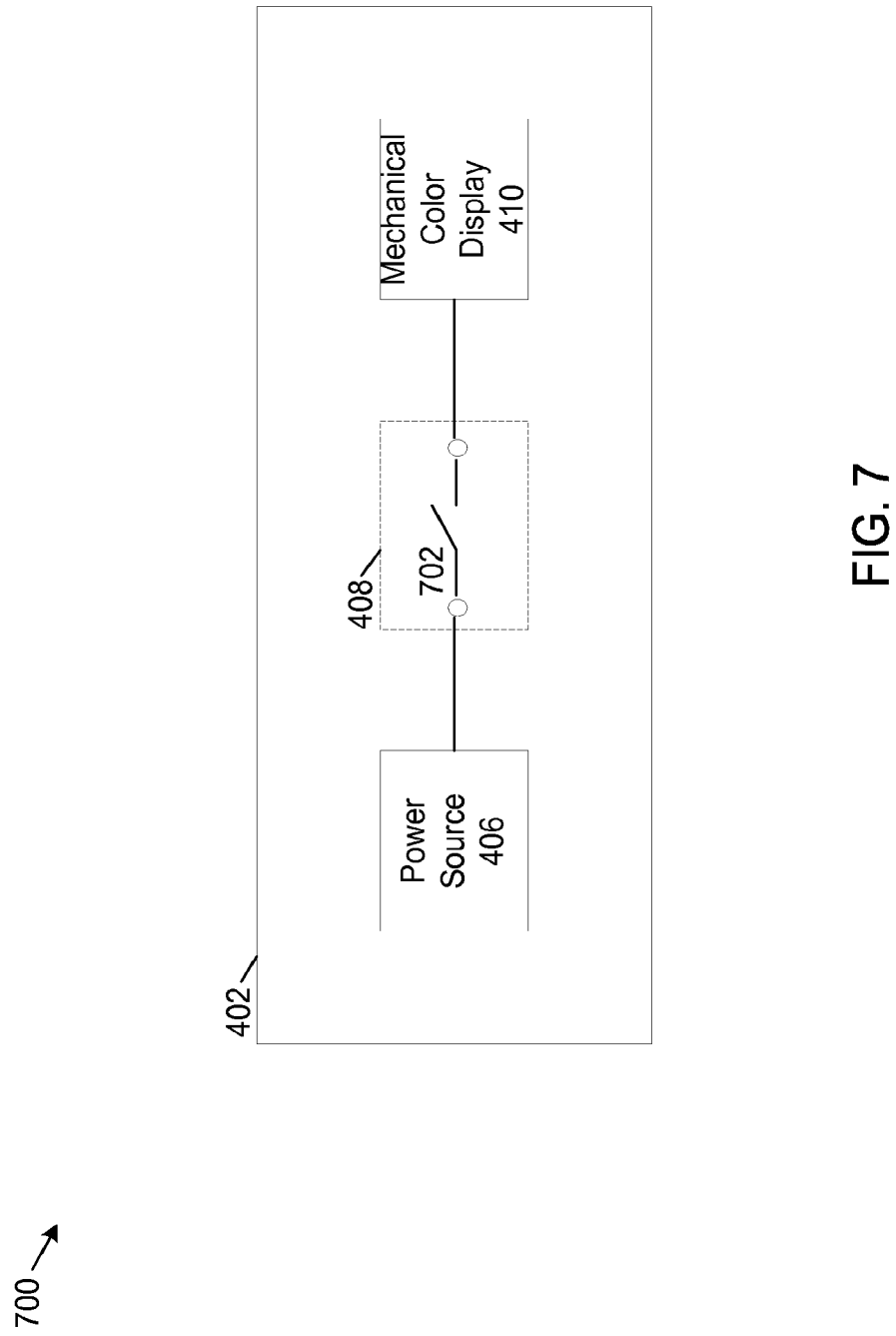
FIG. 7 shows an example electric circuit for the mechanical color display of FIG. 4.

FIG. 7 shows an example implementation 700 of an electrical circuit for a mechanical color display on credit card 106. The example implementation 700 includes the power source 406, the switching component 408 and the mechanical color display 410. The switching component 408 includes an example switch 702. The switch 702 may be a mechanical relay, a solid state relay, a semiconductor switch or another type of switching device.

In an example implementation, the panels of the mechanical color display 710 are configured to rotate 120 degrees each time switch 702 is closed. So, for example, as long as switch 702 moves from an open to a closed position, the panels of the mechanical color display 710 rotate 120 degrees. When the switch 702 is released to an open position and then moved again to a closed position, the panels of the mechanical color display 710 rotate an additional 120 degrees.

In this example implementation, each range of radio frequency signals received at the RFID tag 404 causes a different number of pulses to be generated at the switching component 408. In some implementations, the pulses are generated on the RFID tag 404. In other implementations, the pulses are generated on the switching component 408 or on a semiconductor chip (not shown) external to the RFID tag 404 and the switching component 408.

The financial software application on the mobile electronic device 104 keeps track of a current state of the mechanical color display 410 and determines which range of frequencies to send to the RFID tag 404. For example, if the mechanical color display 410 is currently displaying green, representing a good credit card balance, but the current status of the credit card balance is borderline, the mobile electronic device 104 sends to the RFID tag 404 a radio frequency signal that causes the mechanical color display 410 to rotate 120 degrees. Rotating the mechanical color display 410 120 degrees from a state in which green is displayed causes the mechanical color display 410 to display a yellow color, indicating a borderline credit card balance. Similarly, when the mechanical color display 410 currently displays a green color and the current credit card balance is over the limit, the mobile electronic device 104 sends to the RFID tag 404 a radio frequency signal that causes the mechanical color display to rotate 240 degrees, corresponding to two rotations of 120 degrees.

In another example implementation, the panels of the mechanical color display 410 rotate based on time duration of the electric current at the mechanical color display 410. In this implementation, when electric current is applied to the mechanical color display 410 for a first predetermined time duration, the multi-sided panels of the mechanical color display 410 rotate 120 degrees. When electric current is applied to the mechanical color display 410 for two times the first predetermined time duration, the multi-sided panels of the mechanical color display 410 rotate a total of 240 degrees. In this example implementation, the range of radio frequency signals received at the RFID tag 404 determines the time duration of the electrical signal and the number of degrees to which the multi-sided panels of the mechanical color display 410 are rotated.

Figure 8:
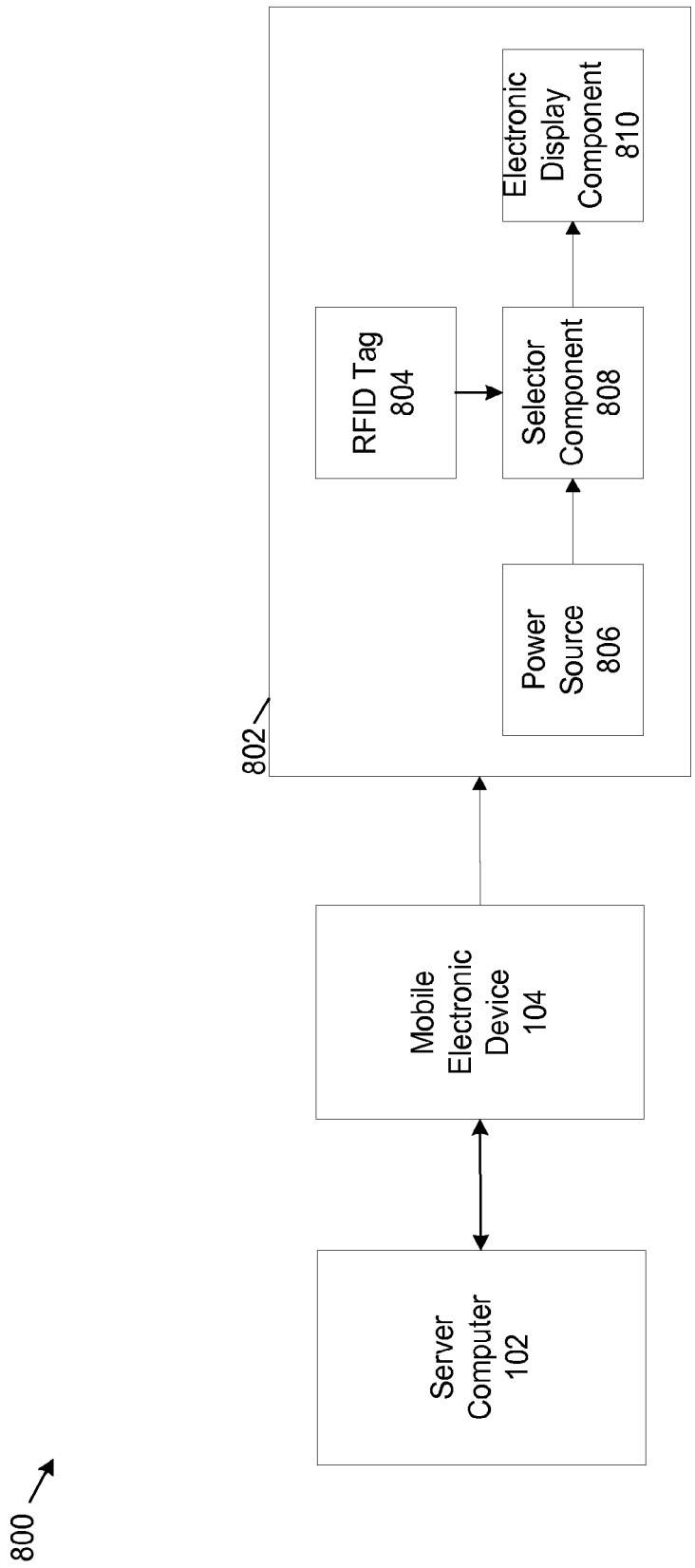
FIG. 8 shows yet another example system that supports a color changing credit or debit card.

FIG. 8 shows an example system 800 that supports a color changing credit or debit card with an electronic display component. The example system 800 includes the server computer 102, the mobile electronic device 104 and a credit card 502. The credit card 802 includes an RFID tag 804, a power source 806, a selector component 808 an electronic display component 810.

The RFID tag 804 and power source 806 are similar to RFID tag 108 and power source 110, respectively. The selector component 808 provides a means to select a particular image on the electronic display component 810. The electronic display component 810 is typically a low-power liquid crystal display (LCD) that can display a plurality of images related to a current credit card balance for a user. For example, one display image show an image indicating a good balance (for example a smiley image), a second image may show an image indicating a borderline balance (for example a caution image) and a third image an image indicating an over limit balance (for example a sad face image or a stop sign). Other images are possible.

In an example implementation, the RFID tag 804 or the selector component 808 may include circuitry that activates a signal line corresponding to a particular credit account status. For example, when the RFID tag 804 receives a radio signal from the mobile electronic device 104 at a frequency range indicating a good balance, the RFID tag 804 or the selector component 808 may activate a signal line corresponding to a good balance. When this signal line is received at the electronic display component 810, the electronic display component 810 displays an image representing a good credit card balance. Similar signal lines are activated corresponding to borderline and over limit balances. The signal lines corresponding to the borderline and over limit balances are activated based on corresponding frequency ranges of the radio frequency signal received at the RFID tag 804 from the mobile electronic device 104.

In some implementations, the electronic display component 810 may depict a fuel gauge or other type of status indicator. For example, when good balance is to be displayed, the fuel gauge may be displayed as full. When a borderline balance is to be displayed, the fuel gauge may be displayed as low. Similarly, when an over limit balance is to be displayed, the fuel gauge may be displayed as empty.

In some implementations, a communication scheme like Near Field Communications (NFC) may be used to communicate with the credit card. NFC is a set of standards for mobile electronic devices such as smart telephones to establish radio communication with a device that supports NFC. The radio communications are established by touching the devices together or bringing the devices into close proximity with each other, for example within a few inches of each other. When NFC is used, the credit card may include a processor or other components that supports NFC.

With NFC, a communications session may be established between the smart telephone and the credit card. Once a communications session is established, credit card account status information may be transmitted from the smart telephone to the credit card via the NFC connection. NFC obviates the need for the smart telephone to generate a specific frequency for a specific credit card account status. The credit card account status is transmitted to the credit card via NFC connection.

In some implementations, in addition to displaying a color on a credit card corresponding to the user's credit card account status, the smart telephone may play music that may be associated with a particular credit card account status. For example, if the user's credit card balance is borderline, indicating that a yellow color is to be displayed on the credit card, the user's smart telephone may play a song or other music associated with the yellow color. For example, the song "The Yellow Rose of Texas" may be played on the user's smart telephone. Similarly, a song associated with the color green, for example "Greensleeves" may be played for a good credit card account status and music associated with the color red may be played for an over limit credit card account status.

For all implementations described herein, power is off on the credit card until activated by the mobile electronic device 104. The power source 110 only provides the electric current when the RFID tag on the credit card receives a radio frequency signal from the mobile electronic device 104 that is within an expected frequency range for the RFID tag. Typically, the radio frequency signal from the mobile electronic device 104 is only activated for a predetermined amount of time, for example 30 seconds. Other predetermined times may be used. After the predetermined amount of time expires, the switches on the credit card open and the electric circuit from the power source 110 is broken. This limits a power drain on the power source 110. A user may adjust the predetermined time via the financial software application on the mobile electronic device. The user may also configure a preset time during the day during which the credit card account status is displayed.

Figure 9:
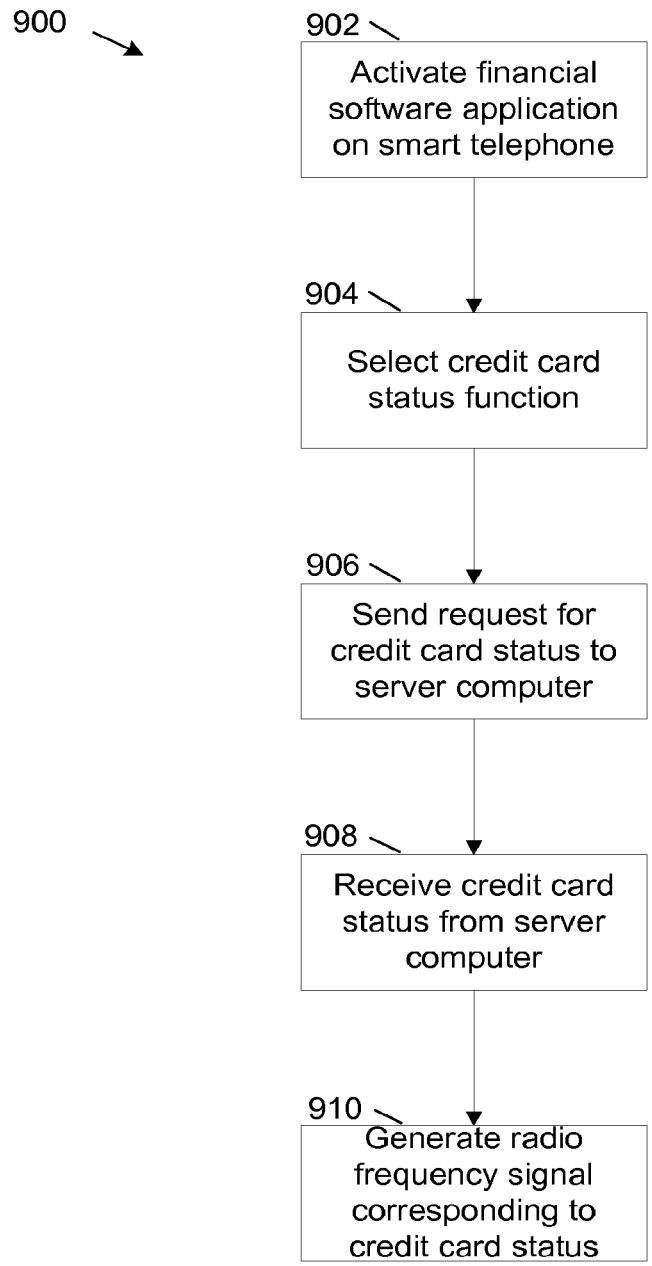
FIG. 9 shows a flowchart of an example method for initiating a display of a user's credit card account status on the credit card of FIG. 1.

FIG. 9 shows a flowchart of a method 900 for initiating from a mobile electronic device a display of a user's credit card account status on the users's credit card. In method 900, the mobile electronic device is a smart telephone.

At operation 902, the user, typically an owner of the credit card, activates a financial software application on the smart telephone. The financial software application is activated when the user presses an icon corresponding to the financial software application.

At operation 904, the user selects a credit card status function on the financial software application. In some implementations, the user presses a button or an icon corresponding to the credit card status function. In other implementations, a credit card status icon is displayed on a home page of the credit card. In these other implementations, the user may simply press the credit card icon or button without needing to activate the financial software application.

At operation 906, a request for credit card status for the user is sent to a server computer, for example to server computer 102. The server computer is a server computer at a bank or other financial institution. Identification information for the user is sent along with the request. In some implementations, the identification information, for example a bank account number and password for the user, is pre-programmed into the smart telephone. This permits the user to initiate with the request for credit card status by simply pressing the credit card status icon or button on the smart telephone. In other implementations, for example when the user initiates the request for credit card status from the financial software application, the user may need to enter or select the account number and password.

At operation 908, credit card status for the user is obtained from the server computer. In some implementations, the credit card status comprises a field in a response message from the server computer. In these implementations, the field may have one of three values—one value, for example the number 1, indicates a good credit card account status, another value, for example the number 2, indicates that a current balance for the credit card is near the credit card limit or a third value, for example the number 3, indicates a bad or over limit credit card status. In other implementations, the server computer may return an actual credit card balance and a credit card limit for the user. In these implementations, the financial software application on the smart telephone may determine the credit card status from the actual credit card balance and credit card limit.

At operation 910, the smart telephone generates a radio frequency signal corresponding to the credit card status. The radio frequency signal may comprise one of three frequencies. One frequency corresponds to a good credit card status, a second frequency corresponds to a borderline credit card status and a third frequency to an over limit credit card status.

The frequencies correspond to matching frequencies or frequency ranges on the user's credit card. The intent is to send the credit card status information to the user's credit card and not to another person's credit card. An RFID device on the user's credit card is configured to match the frequencies sent from the user's smart telephone.

Figure 10:
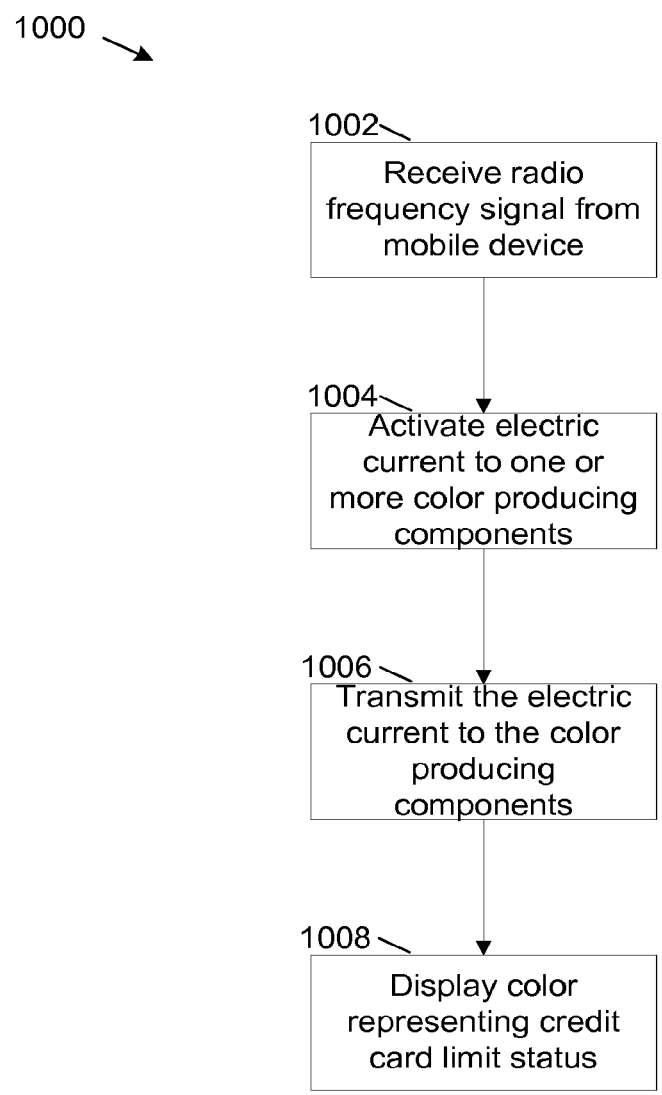
FIG. 10 shows a flowchart of an example method for displaying a color representing a user's credit card account status on the credit card of FIG. 1.

FIG. 10 shows a flowchart of a method 1000 for displaying a color representing a credit card account status on a credit card. The method is typically initiated via a financial software application on a mobile electronic device such as a smart telephone, as discussed above for FIG. 9.

At operation 1002, a radio frequency signal is received by an RFID device on the user's credit card. The radio frequency signal is at a specific frequency or within a range of frequencies corresponding to a credit card account status for the user.

At operation 1004, an electric current is activated to one or more color producing components on the user's credit card. In an implementation where the color producing components comprise foil strips on the credit card, the electric current is activated when an electronic switch, typically a solid state relay or a semiconductor switch, switches one or more foil strips into an electric circuit with a power source, for example as shown in FIG. 2. The more foil strips switched into the electric circuit, the higher the electrical resistance of the electric circuit. The higher the electrical resistance, the more heat that is produced. As discussed earlier herein, different levels of heat produce different colors.

In an implementation where the color producing components comprise a chemical gel, switching electrical resistance into an electric circuit with the power source and the chemical gel causes less electric current to flow through the chemical gel. Switching electrical resistance out of the electric circuit causes more electric current to flow through the chemical get. Differing levels of electric current result in different levels of heat though the chemical gel and thus different colors are produced.

In an implementation where the color producing material comprises a mechanical display, activating the electric current comprises switching electrical current to the mechanical display. In some implementations, the electric current comprises electric pulses to the mechanical display. In other implementations the electric current is a steady state electric current. The electric current is applied to the mechanical display via a switch, typically a solid state relay or a semiconductor switch.

At operation 1008, the color producing material displays a color corresponding to the credit card limit status. For example, as previously discussed, green may be displayed for a good credit card status, yellow may be displayed for a borderline credit card status and red may be displayed for a bad credit card status. When the color producing material is a foil strip, the color is produced when the foil strip is heated by the electric current through the foil strip. When the color producing material is a chemical gel, the color is produced when electricity flows though the chemical gel and heats the chemical gel. When the color producing material is a mechanical display, the color is produced when the mechanical panels of the mechanical display rotate. Each rotation displays a different color, as explained earlier herein.

As illustrated in example FIG. 11, the mobile electronic device 104 includes at least one central processing unit ("CPU") 1102, a system memory 1108, and a system bus 1122 that couples the system memory 1108 to the CPU 1102. The system memory 1108 includes a random access memory ("RAM") 1110 and a read-only memory ("ROM") 1112. A basic input/output system that contains the basic routines that help to transfer information between elements within the mobile electronic device 104, such as during startup, is stored in the ROM 1112. The mobile electronic device 104 further includes a mass storage device 1114. The mass storage device 1114 is able to store software instructions and data. A central processing unit, system memory and mass storage device similar to that in FIG. 11 are also included in server computer 102.

The mass storage device 1114 is connected to the CPU 1102 through a mass storage controller (not shown) connected to the system bus 1122. The mass storage device 1114 and its associated computer-readable data storage media provide non-volatile, non-transitory storage for the mobile electronic device 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 102.

According to various embodiments of the invention, the mobile electronic device 104 may operate in a networked environment using logical connections to remote network devices through the network 1120, such as a wireless network, the Internet, or another type of network. The mobile electronic device 104 may connect to the network 1120 through a network interface unit 1104 connected to the system bus 1122. It should be appreciated that the network interface unit 1104 may also be utilized to connect to other types of networks and remote computing systems. The mobile electronic device 104 also includes an input/output controller 1106 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1114 and the RAM 1110 of the mobile electronic device 104 can store software instructions and data. The software instructions include an operating system 1118 suitable for controlling the operation of the mobile electronic device 104. The mass storage device 1114 and/or the RAM 1110 also store software instructions, that when executed by the CPU 1102, cause the mobile electronic device 104 to provide the functionality of the mobile electronic device 104 discussed in this document. For example, the mass storage device 1114 and/or the RAM 1110 can store software instructions that, when executed by the CPU 1102, cause the mobile electronic device 104 to display received financial data on the display screen of the mobile electronic device 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system comprising:
a mobile electronic device comprising:
at least one central processing unit; and
memory storing instructions for a financial software application that, when executed, cause the at least one central processing unit to:
obtain a payment card status;
select a radiofrequency signal from a set of radiofrequency signals based on the payment card status; and
send, to a radiofrequency device of a payment card, the radiofrequency signal.

2. The system of claim 1, further comprising:
a server,
wherein to obtain the payment card status includes to obtain the payment card status from the server.

3. The system of claim 1, further comprising:
the payment card.

4. The system of claim 3, wherein the payment card comprises:
the radiofrequency device;
a financial status indication component; and
a selector configured to modify the financial status indication component based on a signal received at the radiofrequency device.

5. The system of claim 4,
wherein the mobile electronic device is a device of a user; and
wherein the radiofrequency device is configured to match frequencies sent from a device of the user rather than another user.

6. The system of claim 1, wherein the instructions further cause the at least one central processing unit to play audio associated with the payment card status.

7. The system of claim 1, wherein the set of radiofrequency signals includes:
a first radiofrequency signal corresponding to a good credit status;
a second radiofrequency signal corresponding to a borderline credit status; and
a third radiofrequency signal corresponding to an over limit credit status.

8. A method comprising, with a mobile electronic device:
activating a financial software application;
obtaining a payment card status;
sending, to a radiofrequency device of a payment card, a radiofrequency signal generated based on the payment card status; and
adjusting, based on user input, a predetermined amount of time to send radiofrequency signals to the radiofrequency device of the payment card.

9. The method of claim 8, wherein obtaining the payment card status includes obtaining the payment card status from a server.

10. The method of claim 8, further comprising:
playing audio associated with the payment card status.

11. The method of claim 8, further comprising:
selecting the radiofrequency signal from a set of three radiofrequency signals.

12. The method of claim 11, further comprising:
selecting a first radiofrequency corresponding to a good credit status.

13. The method of claim 12, further comprising:
selecting a second radiofrequency corresponding to a borderline credit status.

14. The method of claim 13, further comprising:
selecting a third radiofrequency corresponding to an over limit credit status.

15. The method of claim 8, further comprising:
determining a current state of a mechanical color display of the payment card; and
generating the radiofrequency signal based on the current state.

16. The method of claim 15, wherein the radiofrequency signal is generated based on a number of degrees to rotate a panel of the mechanical color display based on the current state.

17. A non-transitory computer-readable medium storing instructions for a financial software application that, when executed by at least one central processing unit, cause the at least one central processing unit to:
obtain a payment card status from a server;
select a radiofrequency signal from a set of three radiofrequency signals comprising a first radiofrequency corresponding to a good credit status, a second radiofrequency corresponding to a borderline credit status, and a third radiofrequency corresponding to an over limit credit status;
send, to a radiofrequency device of a payment card, the selected radiofrequency signal for a predetermined amount of time; and
adjust, based on user input, the predetermined amount of time.

18. The non-transitory computer-readable medium of claim 17, wherein the instructions, when executed by the at least one central processing unit, further cause the at least one central processing unit to:
  determine a current state of a mechanical color display of the payment card,
  wherein the radiofrequency signal is selected based on the current state.

* * * * *